(12) United States Patent
Haverstock et al.

(10) Patent No.: US 6,192,415 B1
(45) Date of Patent: *Feb. 20, 2001

(54) WEB SERVER WITH ABILITY TO PROCESS URL REQUESTS FOR NON-MARKUP LANGUAGE OBJECTS AND PERFORM ACTIONS ON THE OBJECTS USING EXECUTABLE INSTRUCTIONS CONTAINED IN THE URL

(75) Inventors: Paul Haverstock, Acton, MA (US);
Miguel Estrada, Nashua, NH (US);
Julio Estrada, Carlisle, MA (US)

(73) Assignee: International Business Machines Corporation, Armonk, NY (US)

( * ) Notice: Under 35 U.S.C. 154(b), the term of this patent shall be extended for 0 days.

This patent is subject to a terminal disclaimer.

(21) Appl. No.: 09/100,117

(22) Filed: Jun. 19, 1998

Related U.S. Application Data

(60) Provisional application No. 60/050,153, filed on Jun. 19, 1997.

(51) Int. Cl.[7] .............................. G06F 15/16; G06F 15/17
(52) U.S. Cl. .......................... 709/245; 709/201; 709/202; 707/513
(58) Field of Search ............................. 707/513; 709/202, 709/245

(56) References Cited

U.S. PATENT DOCUMENTS

| | | | |
|---|---|---|---|
| 5,745,360 | * | 4/1998 | Leone et al. ........................... 707/513 |
| 5,819,302 | * | 10/1998 | Nielsen ................................. 707/523 |
| 5,848,410 | * | 12/1998 | Walls et al. ............................... 707/4 |
| 5,944,791 | * | 8/1999 | Scherpbier ............................ 709/218 |
| 5,956,483 | * | 9/1999 | Grate et al. ............................ 709/203 |

* cited by examiner

Primary Examiner—Mark H. Rinehart
Assistant Examiner—Paul Kang
(74) Attorney, Agent, or Firm—Hunton & Williams

(57) ABSTRACT

A system for enabling access to non-HTML objects from a web browser. The system includes a database for storing non-HTML objects. A system user requests a non-HTML object from a database using a web browser. The web browser transmits the request to a server via a HTTP server and module. The server locates and retrieves the document requested. The module translates the document to a format supported by the web browser. The HTTP server communicates the translated object to the web browser over a network. The web browser then presents the translated object to the system user. The system also enables a server to respond to a URL requests containing action commands from a browser. Action commands and additional arguments are input into the URL. The server receives the request for the URL and processes the actions and arguments identified in the URL.

16 Claims, 3 Drawing Sheets

WEB SERVER WITH ABILITY TO PROCESS URL REQUESTS FOR NON-MARKUP LANGUAGE OBJECTS AND PERFORM ACTIONS ON THE OBJECTS USING EXECUTABLE INSTRUCTIONS CONTAINED IN THE URL

RELATED APPLICATIONS

This application claims priority based on U.S. Provisional Patent Application Ser. No. 60/050,153, entitled "Web Server Application," filed Jun. 19, 1997. This application is also related to co-pending U.S. patent applications entitled, "Web Server Enabling Browser Access to HTML and Non-HTML Documents," Serial No. 09/100,131, filed herewith, "Web Server With Direct Mail Capability," Serial No. 09/100,130, filed herewith, "Web Server With Automated Workflow," Serial No. 09/100,129, filed herewith, "Web Server Providing Role-Based Multi-level Security," Serial No 09/100,128 filed herewith, "Web Server With Unique Identification of Linked Objects," Ser. No. 09/100,118, filed herewith, "Web Server With Integrated Scheduling and Calendaring," Ser. No. 09/100,119, filed herewith, "Web Server Providing HTML Pages Embedded With Non-HTML Views," Ser. No. 09/100,120, filed herewith, and "Web Server Enabling Attachment of HTML and Non-HTML Files To Web Pages," Ser. No. 09/100,121, filed herewith.

FIELD OF THE INVENTION

The invention relates to a web server that has the ability to process a URL with action commands.

BACKGROUND OF THE INVENTION

Web browsers such as Netscape Navigator and Microsoft Internet Explorer are well known. Web browsers are software residing on a client (e.g., a personal computer). Via the browser, the client can communicate with a web server to enable access to and viewing of Hypertext Markup Language (HTML) documents. A web server typically includes a server (e.g., a UNIX- or Windows NT-based computer) connected to a network (e.g., the Internet, an intranet or other network), web server software configured with the host name of the server and the location of HTML objects on the servers and the HTML objects stored by that server.

In general operation, to access a web page, a user enters a request by specifying a uniform resource locator (URL) via the browser and hitting "Submit" (or another function key) and the URL is sent to the web server using HTTP. The web server responds by locating the requested HTML document and returning it to the browser. The browser receives the HTML document, interprets the HTML codes, translates them into a web page, and displays the web page. In this way, web browsers enable access to the vast number of HTML documents via the World Wide Web, the Internet or intranets. HTML generally is well known. A primary purpose of HTML is to describe how to format the text (and other content) of a web page. HTML uses tags to indicate how text of a web page should be displayed and to specify the URL of objects to which a page is linked. HTML objects are commonly stored on a web server as standard text files with a HTM or HTML extension. Linking is a powerful feature of HTML. One drawback with HTML links is that links are created by coding a page with HTML tags to link it to other objects (e.g., another document or a specific location within a document). Therefore creating web pages and links requires a working knowledge of HTML and the time required to write HTML code a create a page and any desired links. Editing an HTML page or a link typically requires using HTML to edit the original web page or link. One significant problem with HTML links is that if a web page (or other object is linked to it) is moved or deleted any links to that page or object needs to be manually changed or a "file not found" message will appear when a user clicks on the link.

One limitation of web browsers and web servers is that they were designed primarily to access HTML documents. Browsers typically cannot cause a web server to retrieve and return non-HTML documents. This inhibits a user from accessing non-HTML documents, objects or databases from a web browser. Non-HTML objects, for example, may include non-HTML documents, stored views for documents in a database, identification files stored in a user directory and many other types of objects. Views provide a convenient way to index a plurality of documents. Identification files may comprise information about a system user (e.g., electronic mail address, role, profile, etc.).

One example of a non-HTML database is Lotus Notes. Lotus Notes is a popular software system, rich with a number of well-known functions. These functions, however, are typically accessed via a client terminal (loaded with Lotus Notes client software) communicating with a server (loaded with Lotus Notes server software). Because Notes is not an HTML-based application, it has not been practical to access objects in a Notes database via a standard web browser.

Standard web servers can read a URL to locate a page in pages specified in the URL. One limitation of existing browser/web server systems is that they cannot access non-page based databases. For example, a known, popular database is Lotus Notes®. Notes® databases include Forms, Document Views, etc. Because URLs specify page locations, URLs have not to date been useable to access other types of objects.

Using browser technology, a system user can read or fill out a form with data to create a page. But cannot, for example, create a form from a web client (browser). Typically, this requires programming (e.g., using a computer gateway interface (CGI)). A simple example, is as follows:

<FORM METHOD=POST ACTION=PCWEEK/PROCESS.EXE>

<INPUT TYPE=TEXT NAME=SSN>

</FORM>

This simple code resides on the web server.

SUMMARY OF THE INVENTION

One object of the invention is to overcome these and other drawbacks present in existing systems.

Another object of the invention is to provide a web server that can respond to requests from a web browser for either HTML or non-HTML documents and return the requested documents to the web browser.

Another object of the invention is to provide web browser access to objects other than HTML pages by incorporating action commands into URLs.

Other objects and advantages of the invention also exist.

According to one embodiment of the invention, the system comprises a novel web server for a client/server network, where the client side is equipped with a standard browser. The server comprises standard web server functionality (e.g., HTTP server), an HTML translator, a server side software (e.g., Lotus Notes server software) and a database (e.g., a Lotus Notes database). Significantly, the database does not need HTML objects. Preferably, the server receives a URL-based request from a browser via HTTP, the HTTP server and HTML translator determine the object (e.g., documents or databases) specified by the URL, retrieves that object, translates that object to HTML format and sends the HTML downloaded object to the client side browser for display.

According to one aspect of the invention, the system enables a server to respond to URL requests containing action commands from a browser. A system user inputs a URL into a browser. In addition to identifying the object, the system user may also input action commands and arguments in the URL. The server locates and retrieves the object and processes the actions and arguments identified in the URL.

DETAILED DESCRIPTION OF THE PREFERRED EMBODIMENTS

Figure 1:
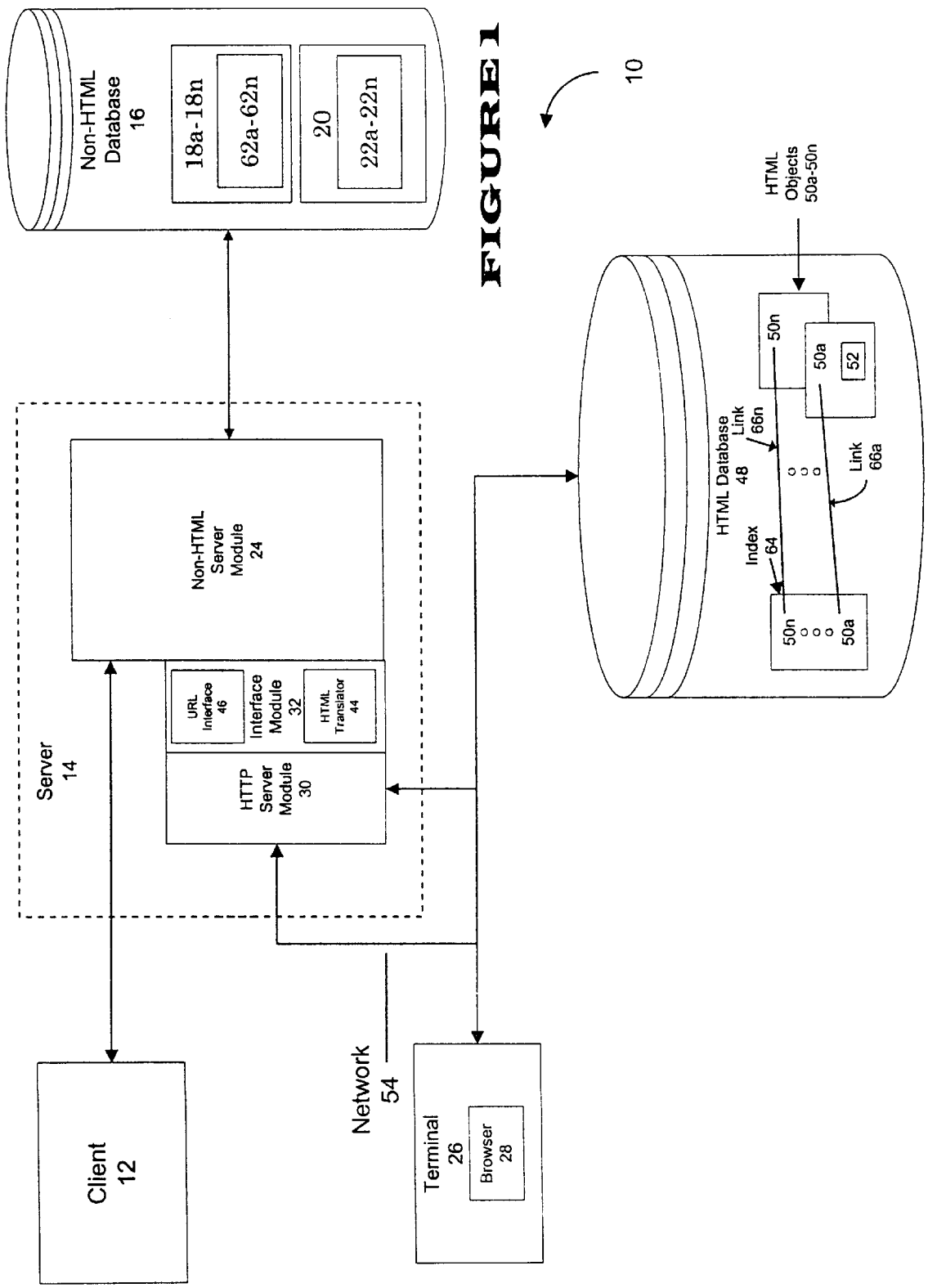
FIG. 1 is a block diagram illustrating an overall system in accordance with one embodiment of the invention.

As schematically illustrated in the block diagram of FIG. 1, one aspect of the invention relates to a client/server network system 10 enabling access to both HTML objects 50a–50n (e.g., HTML documents) and non-HTML objects 18a–18n using a web browser 28 residing on a terminal 26. Preferably, web browser 28 supports Internet and Web protocols (e.g., HyperText Transfer Protocol (HTTP) and TCP/IP). The system may further comprise a client 12 to enable a non-browser client access to non-HTML server module 24 to retrieve non-HTML objects 18a–18n from non-HTML database 16.

A server 14 preferably comprises a HTTP server module 30, interface module 32 and non-HTML server module 24. As further illustrated in FIG. 1, the server side of system 10 may comprise a non-HTML database 16 in communication with server 14. Preferably, non-HTML database 16 stores one or more non-HTML objects 18a–18n, each at least some of which having one or more non-HTML fields $62a–62_n$, and a user directory 20. User directory 20 includes one or more user objects 22a–22n. User objects 22a–22n may include information about a user (e.g., electronic mail address, role, profile, etc.). Terminal 26 and server 14 can be in communication via a network 54 (e.g., Internet, Intranet or other network).

According to one aspect of the invention, a user submits a URL-based request for an object via browser 28. The request is passed to server 14 using HTTP (or other protocol). Server 14 receives the request via HTTP server module 30 and passes object location information to interface module 32 via URL interface 46. URL interface 46 transmits that information to non HTML server module 24. Non-HTML server module 24 retrieves the requested object and passes it to interface module 32. A HTML translator portion 44 of interface module 32 translates the non-HTML object to a HTML representation of the requested object and the HTML representation is returned to browser 28 via HTTP server module 30.

System 10 also enables browser 28 to access HTML objects 50a–50n using HTTP server 30 or a conventional web server 56 in a known manner. A conventional editor may be used to edit HTML objects within the system. A conventional technique (e.g., a computer gateway interface (CGI)) may be used to store the edited HTML objects in the HTML database.

Thus, one advantage of the invention is that server 14 enables a browser 28 to request both HTML objects 50a–50n and non-HTML objects 18a–18n. Additional advantages derive from this capability. For example, one significant advantage is that the invention exposes powerful resources available in non-HTML databases 16 to a web browser 28 according to one embodiment of the invention.

Preferably, the invention comprises a Lotus Notes server. Advantageously, even with this embodiment a standard browser-based client may be used. As detailed below, Lotus Notes provides the non-HTML server module 24 a rich set of services that has made it a leading messaging and groupware platform. By expressing Notes capabilities to the Web (using a browser) via the present invention, Web developers can take advantage of an architecture that integrates database, security, directory, messaging, workflow, replication, and application development technology in a single platform heretofore lacking in browser based systems using HTML objects.

Lotus Notes, for example, is a robust system offering many features (e.g., forms, views, navigators, agents, folders, etc.). These resources in general are known, however, the ability to expose the features to a web browser is accomplished according to one aspect of the invention. Because Lotus Notes provides these and other features, Notes will be used to illustrate how features of a non-HTML database may be exposed to a web browser using the invention. Although Lotus Notes is used by way of example, the invention may be used with other non-HTML databases.

One advantage of the invention is that it enables browser 28 access to non-HTML objects (e.g., user objects 22a–22n) via a non-HTML server module 24. Through communication with the non-HTML server module 24, browser 28 is provided with additional functionality (i.e., functions supported by non-HTML server module). For example, non-HTML server module may comprise a security module. Because browser 28 retrieves non-HTML objects using non-HTML server module 24, the security module controls access to the non-HTML objects based on predetermined criteria. Therefore, this function is exposed to browsers.

For example, system 10 retrieves non-HTML objects 18a–18n via non-HTML server module 24. By communicating with non-HTML server module 24, system 10 permits web browser 28 to utilize functions of non-HTML server module 24. For example, a system user may access non-HTML objects 18 from non-HTML database 16 (e.g., a Lotus Notes database). When non-HTML object 18a is retrieved using non-HTML server module 24, functions associated with non-HTML object 18a become available to the system user. For example, non-HTML object 18a may comprise an agent which transmits a message or facsimile notifying another system user that non-HTML object 18a has been accessed. The invention exposes this and other functions provided by non-HTML server modules 24 to browsers 28.

The system may use a bi-directional replication process to ensure that all system users are accessing the most recent versions of HTML objects 50a–50n. The replication process used is efficient because it is selective, can be scheduled, and can perform at the field-level. Selective replication enables administrators to replicate only a subset of data within the HTML database (for example, specific databases or HTML objects). Replication may be scheduled to run when networking costs are minimized. With field level replication, only those fields within HTML objects that are new or have been changed on either side of the replication process need to be replicated. With these sophisticated replication capabilities as a part of the infrastructure, developers can focus on creating Web applications which enable business processes within and across lines of business and corporate boundaries. The benefit to the user is easier manageability of databases and data integrity in all sites.

During replication, directory changes are also replicated, because the directory is simply another database in the invention, with the same structure and properties as a Web page library. Therefore, for example, discussion forums can be replicated, because discussions are simply another instance of a database.

When a user requests an HTML object from a HTML database using a URL, the URL typically only identifies the object, without identifying any non-HTML commands. In general, HTTP servers use the URL to identify the location of a resource (e.g., an object). They typically do not perform action on or relating to the object itself. By exposing Lotus Notes functionality to a browser-based system, the system of the invention, however, enables non-HTML actions to be identified in the URL and the action to be performed on or relating to the object. For example, a system user wishing to retrieve a sales record for a salesperson ("John") working in the east coast division of "Company A" may enter the following URL into a browser: http://www.companya.com/ sales.nsf/east/john?opendoc. This URL permits server 24 (e.g., Notes server) to retrieve the file containing John's sales records and open that document. Other actions may also be used (e.g., run file, create new file, etc.) Additionally, the system user may identify additional non-HTML arguments placed on the file being retrieved. For example, John's sales records file may be opened to display only John's last ten (10) sales, sales that occurred within the past five (5) years, etc.

Identifying non-HTML actions and arguments in the URL allows system users to retrieve objects and identify actions with a single input command without requiring programming code. This is a significant advantage over prior systems that cannot process such action commands included in a URL. For example, in some prior systems, if a system user wishes to have an action carried out when a particular object is retrieved, the action must be preprogrammed into the code or identified outside the URL (e.g., get or post actions). The ability to enable functions without require preprogramming is one feature of the invention.

Preferably, when interface module 32 receives a URL-based request, interface module 32 parses the URL to determine non-HTML object information (e.g., type, identity, location, etc.). If the URL includes an action command to be performed on the non-HTML object, interface module 32 also determines the action to be performed. This information is passed to non-HTML server module 24 which retrieves the requested non-HTML object. Interface module 32 then translates the requested non-HTML object into an HTML object. If an action command is specified in the URL, interface module 32 determines the HTML command corresponding to the non-HTML command supported by non-HTML server module 24 (e.g., open, create, delete, etc.). As part of the process, the HTML command is performed and the HTML object is communicated to web browser 28 via HTTP server module 30.

Translating commands may be performed using a rules-based translation. A rules-based translation mediates between two or more server formats and determines commands corresponding to the other object formats. For example, Lotus Notes includes a table sort command. This permits tables to be sorted according to column headings. If a user wishes to sort a table according to a particular heading, the user may "click" on the heading. Notes then sorts the table according to the heading. If a system user requests a non-HTML object (e.g., a table) from a Notes database and specifies an action command (e.g., sort) in the URL, interface module 32 translates the actions to a corresponding Notes action and performs the action command. Notes creates a view including the sorted table. Interface module 32 then provides a link to the view created.

Collaboration sites handle the activity that occurs among people and the information that they handle. Typical collaborative activities include discussions and brainstorming, review and approval cycles, human resource employee reviews and candidate interview processes. The creation of most content is a collaborative process: creating a press release, white paper, or even a job posting normally involves more than one person. Providing customer service after a sale has been made is also a collaborative process that involves the customer and at least one other person inside a company. That is, collaboration is an integral activity that surrounds content and commerce. There is very little, if any, Web technology in place to effectively support collaboration.

One embodiment of the invention relates to a Web application server, its basic architecture and the integral services that lend themselves to the rapid development and deployment of collaborative applications that support content and commerce.

Figure 2:
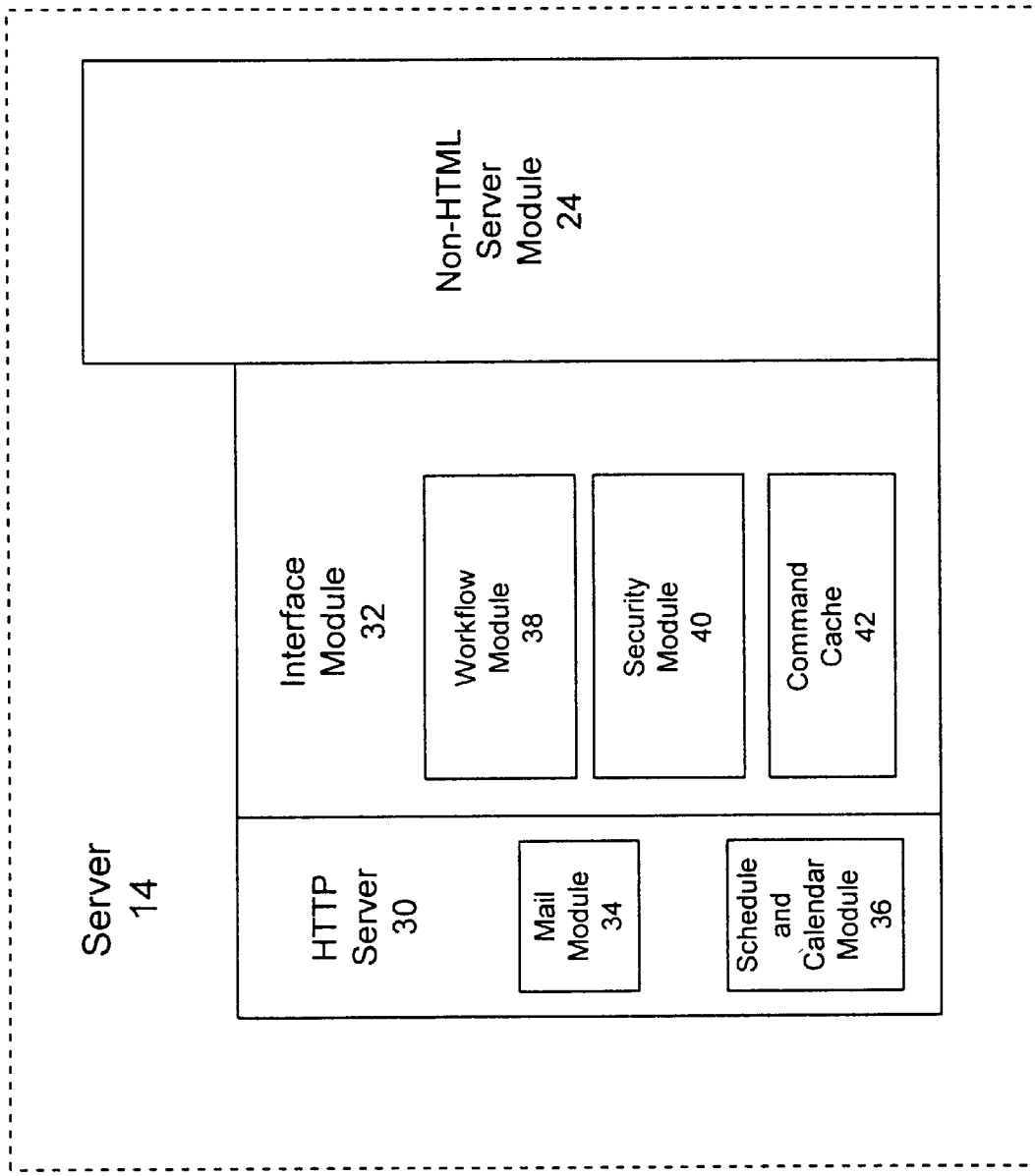
FIG. 2 is a block diagram illustrating an interface module in accordance with one embodiment of the invention.

To realize these and other capabilities, server 14 may further comprise various modules as depicted in FIG. 2. For example, HTTP server 30 may further comprise a mail application module 34 and a scheduling and calendaring application module 36. Interface module 32 may further comprise a workflow module 38, command cache 42 and a security module 40.

The additional components shown in FIG. 2 enable various capabilities to be provided to enhance the advantages of the system. Each of these components and examples of the added capabilities is described below.

Figure 3:
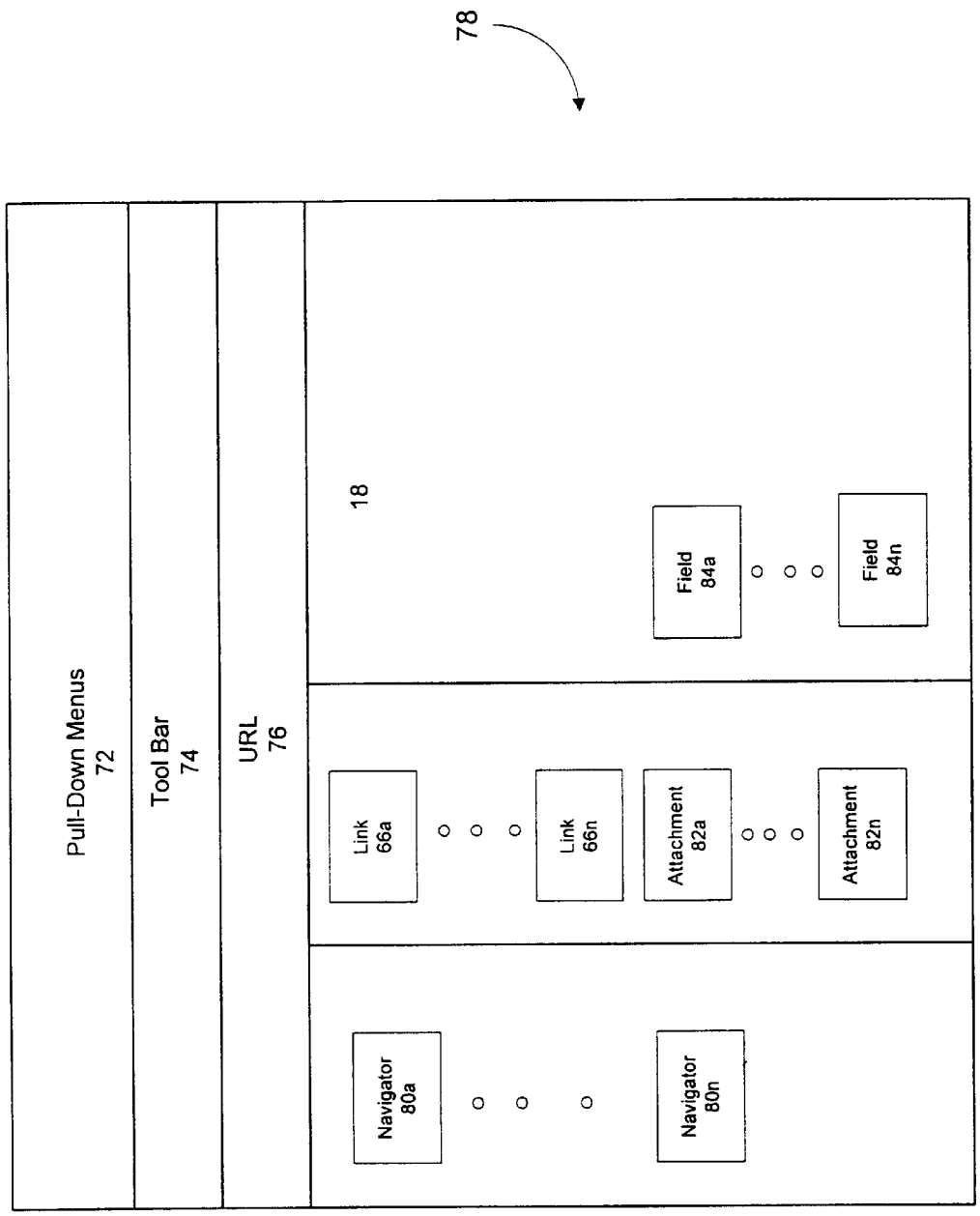
FIG. 3 is a view of a display in accordance with one embodiment of the invention.

FIG. 3 illustrates a HTML object 50*a* in accordance with one embodiment of the invention. System 10 permits a representation of non-HTML objects 18*a*–18*n* to be embedded within HTML objects 50*a*–50*n*. For example, a system user may retrieve HTML object 50*a*. The system user may request non-HTML object 18*a* to be displayed within HTML object 50*a*. System 10 retrieves non-HTML object 18*a*. Non-HTML object 18*a* is translated to a HTML representation 50*n* of non-HTML object 18*a*. System 10 uses HTML representation 50*n* to embed HTML representation 50*n* in HTML object 50*a*. FIG. 3 shows HTML object 50*a* with non-HTML objects (and other objects) embedded therein (e.g., pull-down menus 72, a tool bar 74, a URL identifier 76, a form 78, navigators 80, links 66, attachments 82 and fields 62). After non-HTML object 18*a* is embedded within HTML object 50*a*, HTML object 50*a* may be saved as another object which includes embedded non-HTML object 18*a*.

Preferably, HTML representation 50*n* comprises a table tag and HTML formatting tags. HTML tags are codes used in a HTML object that determine the layout of a HTML object. Views may comprise links to other views. For example, an object may contain a graphical representation of a view. The representation provides a link to the view which is retrieved when a user "clicks" on the representation. When a system user "clicks" on the representation, a URL request for that view is transmitted to HTTP server module 30. HTTP server module communicates the request to URL interface 46 of interface module 32. URL interface 46 converts the request into a format supported by non-HTML server module 24. Non-HTML server module 24 locates and retrieves the view requested and transmits the view to interface module 32. HTML translator 44 translates the view into HTML and passes the translated view to HTTP server module 30. HTTP server module 30 communicates the view requested to browser 28 for presenting to the system user. This process may be repeated for each additional view requested by the system user.

Navigators may also be embedded within HTML objects 50a–50n. Navigators assist system users in moving through documents. Navigators may be graphical representations or text that identify other portions of a document, other documents, etc. For example, a non-HTML object is requested by a system user. The non-HTML document may comprise a navigator. Module 30 translates the non-HTML object and navigator into HTML object 50a.

System 10 may also comprise a command cache 42. Command cache 42 maintains a record of a predetermined number of commands input by a system user. Commands may be stored based on system users. For example, a system user inputs a command, system 10 stores the command in command cache 42. Once a command is stored, system 10 checks whether subsequent commands input by the system user are stored in command cache 42. If system 10 locates the command in command cache 42, the stored command is used to process the command. This reduces the time necessary to process requests because system 10 does not have to repeat commands already executed. For example, a system user inputs a command "Retrieve Work File." The retrieve work file command may require system 10 to determine the object store storing the file, locate the position within the object store, retrieve the file and transmit the file to the system user. Subsequently (e.g., the following day), the system user inputs the same command. Before processing the command, system 10 determines whether the command "Retrieve Work File" is stored in command cache 42. If system 10 locates the command, the stored command is used to execute the command because the command has already been processed. In this manner, system 10 does not repeat commands previously executed and thus reduces processing time.

What is claimed is:

1. A server system enabling a server to process URL requests for one or more non-markup language objects, the URL comprising at least one executable instruction, the system comprising:

a server;

at least one database in communication with the server;

one or more non-markup language objects stored on the at least one database;

a communicating module being operable to communicate the URL request for the one or more non-markup language objects, wherein the URL comprises an object locator and at least one executable instruction; and wherein the server, upon receipt of the URL, asks the one or more non-markup language objects to perform the at least one executable instruction provided in the URL.

2. The system of claim 1 wherein said server is operable to convert the non-markup language object to a markup language object.

3. The system of claim 1 wherein the URL further comprises arguments identifying parameters associated with the at least one executable instruction.

4. A server system enabling a server to process URL requests for one or more non-markup language objects, the URL comprising at least one executable instruction, the system comprising:

storing means for storing one or more non-markup language objects;

requesting means for requesting the one or more non-markup language objects using the URL, the URL comprising an object locator and at least one executable instruction;

receiving means for receiving the URL for the one or more non-markup language objects; and wherein the receiving means, upon receipt of the URL, asks the one or more non-markup language objects to process the at least one executable instruction provided in the URL.

5. The system of claim 4 wherein the URL further comprises arguments identifying parameters associated with the at least one executable instruction.

6. A method for enabling a server to process URL requests for one or more non-markup language objects, the URL comprising at least one executable instruction the method comprising the steps of:

storing one or more non-markup language objects in at least one database;

requesting the one or more non-markup language objects using the URL, the URL comprising at least one executable instruction; and asking the one or more non-markup language objects to process the at least one executable instruction provided in the URL.

7. The method of claim 6, further comprising the step of identifying parameters associated with the at least one executable instruction.

8. An electronic storage medium having processor readable code embodied therein for enabling a server to process at least one executable instruction contained in a URL, the electronic storage medium comprising:

processor readable code for causing a processor to store one or more non-markup language objects in at least one database;

processor readable code for causing a processor to request the one or more non-markup language objects by identifying the one or more non-markup language objects and at least one executable instruction associated with the one or more non-markup language objects in the URL;

processor readable code for causing a processor to receive the URL and locate the one or more non-markup language objects; and processor readable code for causing a processor to ask the one or more non-markup language objects to process the at least one executable instruction provided in the URL.

9. The medium of claim 8, wherein the URL further comprises arguments identifying parameters associated with the at least one executable instruction.

10. The medium of claim 8, wherein the server is operable to convert the non-markup language object to a markup language object.

11. The medium of claim 8, wherein the URL further comprises arguments identifying parameters associated with the at least one executable instruction.

12. The system of claim 4, wherein the server is operable to convert the non-markup language object to a markup language object.

13. The system of claim 1, wherein the executable instruction differs based on the one or more non-markup language objects requested.

14. The system of claim 4, wherein the executable instruction differs based on the one or more non-markup language objects requested.

15. The method of claim 6, wherein the executable instruction differs based on the one or more non-markup language objects requested.

16. The medium of claim 8, wherein the executable instruction differs based on the one or more non-markup language objects requested.

* * * * *